United States Patent
Duan et al.

(10) Patent No.: US 10,473,195 B2
(45) Date of Patent: Nov. 12, 2019

(54) CONTINUOUSLY-VARIABLE TRANSMISSION

(71) Applicant: GM GLOBAL TECHNOLOGY OPERATIONS LLC, Detroit, MI (US)

(72) Inventors: Chengwu Duan, Shanghai (CN); Farzad Samie, Franklin, MI (US); Jian Yao, Shanghai (CN); Chi-Kuan Kao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 268 days.

(21) Appl. No.: 15/615,387

(22) Filed: Jun. 6, 2017

(65) Prior Publication Data
US 2018/0347673 A1    Dec. 6, 2018

(51) Int. Cl.
| | | |
|---|---|---|
| F16H 9/12 | (2006.01) | |
| F16H 9/16 | (2006.01) | |
| F16H 9/24 | (2006.01) | |

(52) U.S. Cl.
CPC .............. F16H 9/125 (2013.01); F16H 9/16 (2013.01); *F16H 2009/163* (2013.01); *F16H 2009/245* (2013.01)

(58) Field of Classification Search
CPC .. F16H 55/56; F16H 61/66272; F16H 63/065; F16H 61/66263; F02B 39/04
USPC ............................................................ 474/8
See application file for complete search history.

(56) References Cited

U.S. PATENT DOCUMENTS

| | | | | |
|---|---|---|---|---|
| 3,052,132 A | * | 9/1962 | Karig .................... | F16H 61/662 474/18 |
| 3,704,634 A | * | 12/1972 | Schrodt ................ | F16H 63/065 474/18 |
| 4,010,654 A | * | 3/1977 | Maucher ................ | F16H 55/56 474/13 |
| 4,229,988 A | * | 10/1980 | Rattunde ................... | F16H 9/18 474/28 |
| 4,386,920 A | * | 6/1983 | Keck ....................... | F16H 55/56 474/39 |
| 4,484,901 A | * | 11/1984 | Toti ................... | F16H 61/66263 474/28 |
| 4,543,077 A | * | 9/1985 | Yamamuro ........... | B60W 10/06 474/12 |

(Continued)

*Primary Examiner* — Henry Y Liu
(74) *Attorney, Agent, or Firm* — Quinn IP Law

(57) ABSTRACT

A continuously-variable transmission (CVT) assembly is employed for transmitting a torque from an external power-source. The CVT includes a variable-diameter input pulley and a variable-diameter output pulley, each having a respective range of adjustment. The CVT also includes a continuous torque-transmitting element extending between the variable-diameter input pulley and the variable-diameter output pulley, and thereby operatively connecting the input pulley to the output pulley. The CVT additionally includes a first elastic element having a first zero stiffness over the range of adjustment of the variable-diameter input pulley and configured to apply a first constant spring clamping force via the input pulley to the continuous torque-transmitting element. Furthermore, the CVT includes a second elastic element having a second zero stiffness over the range of adjustment of the variable-diameter input pulley and configured to apply a second constant spring clamping force via the output pulley to the continuous torque-transmitting element.

20 Claims, 4 Drawing Sheets

(56) References Cited

U.S. PATENT DOCUMENTS

| | | | | |
|---|---|---|---|---|
| 4,569,670 A * | 2/1986 | McIntosh | F02B 67/06 | 474/16 |
| 4,573,948 A * | 3/1986 | Thirion de Briel | F16F 1/32 | 474/13 |
| 4,617,004 A * | 10/1986 | Mott | F16H 55/56 | 474/28 |
| 4,639,238 A * | 1/1987 | Jaccod | F16H 55/56 | 474/28 |
| 4,639,239 A * | 1/1987 | Thirion de Briel | F16J 15/3268 | 474/28 |
| 4,722,719 A * | 2/1988 | Klopfenstein | F16H 9/12 | 474/18 |
| 4,798,561 A * | 1/1989 | Hattori | F16H 61/66259 | 474/18 |
| 4,876,920 A * | 10/1989 | Eichenberger | F16H 37/021 | 475/66 |
| 4,881,926 A * | 11/1989 | Aoki | F16H 61/66245 | 474/25 |
| 4,919,643 A * | 4/1990 | Fuss | F16H 37/022 | 474/46 |
| 5,031,481 A * | 7/1991 | Algrain | F16H 61/66259 | 474/28 |
| 5,145,464 A * | 9/1992 | Mori | F16H 61/66272 | 474/16 |
| 5,334,104 A * | 8/1994 | Schuernnans | F16H 61/66272 | 474/28 |
| 5,361,744 A * | 11/1994 | Teraoka | F02B 39/04 | 123/561 |
| 5,462,035 A * | 10/1995 | Teraoka | F02B 39/04 | 123/561 |
| 6,129,643 A * | 10/2000 | Tamagawa | F16H 55/56 | 474/10 |
| 6,234,925 B1 * | 5/2001 | Walter | F16H 63/065 | 267/180 |
| 6,248,035 B1 * | 6/2001 | Bartlett | F16H 55/56 | 474/100 |
| 6,589,126 B1 * | 7/2003 | Muller | F16H 63/065 | 474/12 |
| 7,014,583 B2 * | 3/2006 | Diosi | F16H 61/66272 | 474/12 |
| 7,175,554 B2 * | 2/2007 | Van Spijk | F16H 61/66272 | 474/46 |
| 7,575,528 B2 * | 8/2009 | Plath | F16H 55/56 | 474/28 |
| 7,686,715 B2 * | 3/2010 | Carlson | F16H 63/065 | 474/18 |
| 7,811,187 B2 * | 10/2010 | Koyanna | F16H 63/065 | 474/28 |
| 8,092,325 B2 * | 1/2012 | Nozawa | F16H 63/065 | 474/18 |
| 8,414,433 B2 * | 4/2013 | Kadokawa | F16H 9/18 | 474/18 |
| 8,517,871 B2 * | 8/2013 | Ogata | F16H 61/66272 | 474/28 |
| 2005/0181899 A1 * | 8/2005 | Plath | F16H 55/56 | 474/18 |

* cited by examiner

CONTINUOUSLY-VARIABLE TRANSMISSION

INTRODUCTION

The disclosure relates to a continuously-variable transmission (CVT) for a motor vehicle.

A typical modern motor vehicle uses a transmission to enable a power-source, such as an internal combustion engine, to power the vehicle across a wide range of road speeds with desired acceleration and efficiency. Frequently such transmissions are automatic or self-shifting. Such transmissions are constructed to automatically change gear ratios as the vehicle moves at different road speeds, freeing the driver of the vehicle from having to shift gears manually. Like a manual transmission, an automatic transmission allows an internal combustion engine, best suited to run at a relatively high rotational speed, to provide a range of speed and torque outputs necessary for driving the vehicle in various conditions. An automatic transmission may offer a fixed number of gear ratios or be configured as a CVT that may change steplessly through a continuous range of effective gear ratios.

In general, a CVT may change through an infinite number of effective gear ratios between a maximum gear ratio and a minimum gear ratio. A typical continuously variable transmission includes two adjustable pulleys, each having two sheaves. A belt or any suitable endless rotatable device, such as a continuous loop cable or chain, typically runs between the two pulleys, with the two sheaves of each of the pulleys sandwiching the belt therebetween. Frictional engagement between the sheaves of each pulley and the belt couples the belt to each of the pulleys to transfer a torque from one pulley to the other. One of the pulleys may function as a drive pulley so that the other pulley may be driven by the drive pulley via the belt. The gear ratio is the ratio of the torque of the driven pulley to the torque of the drive pulley. The gear ratio may be changed by moving the two sheaves of one of the pulleys closer together and the two sheaves of the other pulley farther apart, causing the belt to ride higher or lower on the respective pulley.

SUMMARY

A continuously-variable transmission (CVT) assembly is disclosed for transmitting a torque from an external power-source. The CVT includes a variable-diameter input pulley and a variable-diameter output pulley, each having a range of adjustment. The CVT also includes a continuous torque-transmitting element extending between the variable-diameter input pulley and the variable-diameter output pulley, and thereby operatively connecting the input pulley to the output pulley. The CVT additionally includes a first elastic element having a first zero stiffness or spring rate over the range of adjustment of the variable-diameter input pulley and configured to apply a first constant spring clamping force via the variable-diameter input pulley to the continuous torque-transmitting element. Furthermore, the CVT includes a second elastic element having a second zero stiffness over the range of adjustment of the variable-diameter input pulley and configured to apply a second constant spring clamping force via the variable-diameter output pulley to the continuous torque-transmitting element.

At least one of the first and second elastic elements may be configured as at least one Belleville spring.

At least one Belleville spring may include multiple Belleville springs arranged in a stack.

Two adjacent Belleville springs in the stack may be adjacent and arranged in series, such as facing in alternating directions.

The CVT assembly may additionally include a spacer arranged between the two adjacent Belleville springs.

Each of the two adjacent Belleville springs may be defined by an outer diameter and an inner diameter. The spacer may then be configured to guide the two adjacent Belleville springs relative to each other at one of the respective outer diameters and respective inner diameters.

The spacer may include a retaining feature configured to engage the two adjacent Belleville springs at the respective outer or inner diameters.

The CVT may additionally include an input elastic element housing and an output elastic element housing. In such a construction, the first elastic element may be arranged inside the input elastic element housing, while the second elastic element may be arranged inside the output elastic element housing.

The input elastic element housing and output elastic element housing may be respectively configured to guide the first elastic element and second elastic element.

The CVT may also include an input actuator configured to generate an input actuator force and establish the range of adjustment of the variable-diameter input pulley and vary the diameter thereof. The CVT may additionally include an output actuator configured to generate an output actuator force and establish the range of adjustment of the variable-diameter output pulley and vary the diameter thereof. In such a case, the input and output actuators may together select a position of the continuous torque-transmitting element.

A motor vehicle having such a CVT assembly connected to a power-source is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
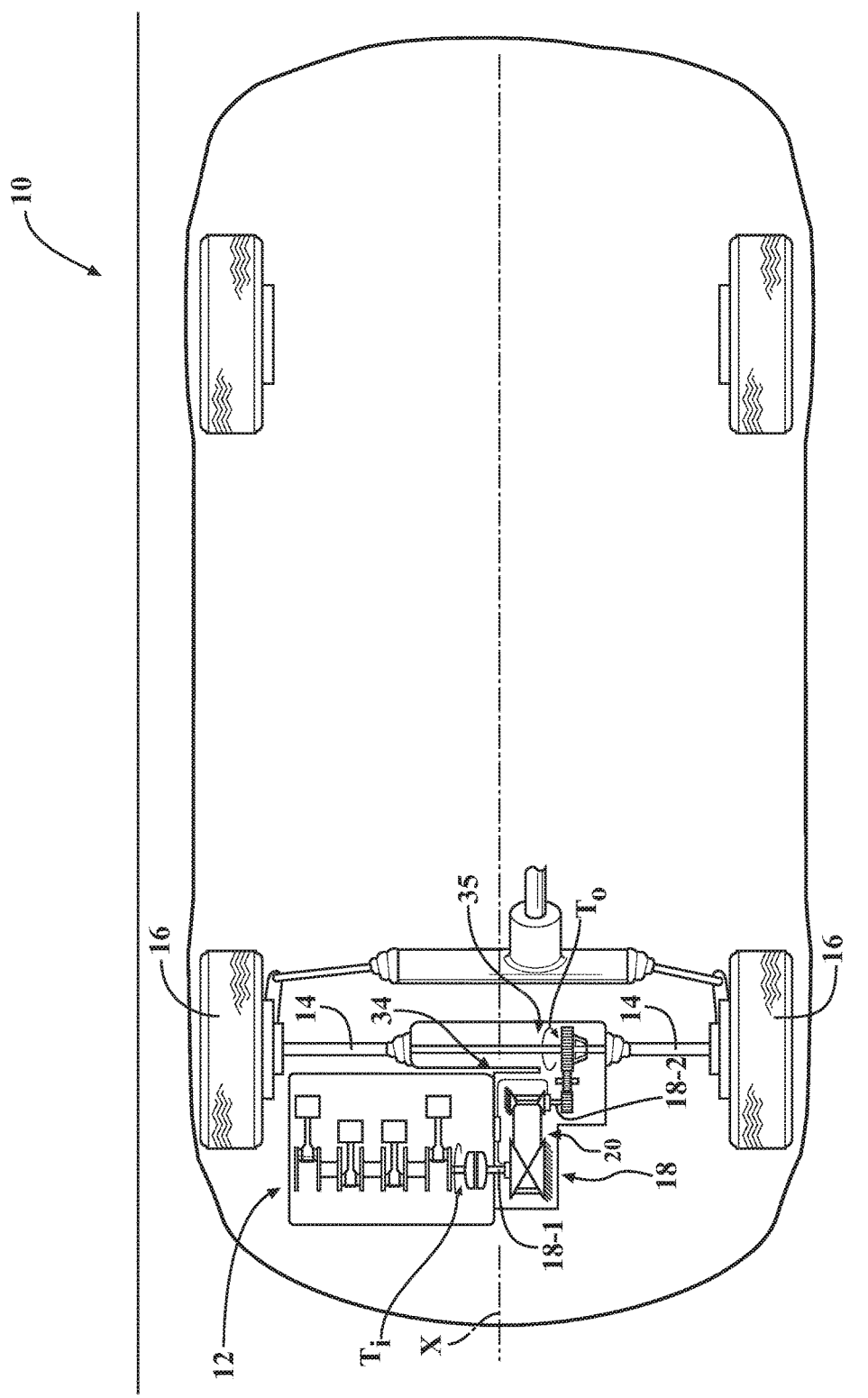
FIG. 1 is a schematic illustration of a vehicle employing a power source connected via a continuously-variable transmission (CVT) assembly to a drive axle, according to the disclosure.

Referring to the drawings in which like elements are identified with identical numerals throughout, FIG. 1 illustrates a motor vehicle 10 having a power-source 12, shown as an internal combustion engine. It is noted, however, that the power-source 12 may be any appropriate power-source configured to generate a power-source torque $T_1$ for driving the vehicle 10, such as an internal combustion engine, an electric motor-generator, a fuel cell, or a combination thereof. The power-source 12 is operatively connected to one or more drive axles 14 that include respective sets of driven wheels 16. The motor vehicle 10 may include, without being limited to, a commercial vehicle, industrial vehicle, passenger vehicle, train, or the like. As shown, the vehicle 10 is generally arranged along a longitudinal vehicle axis X.

Figure 2:
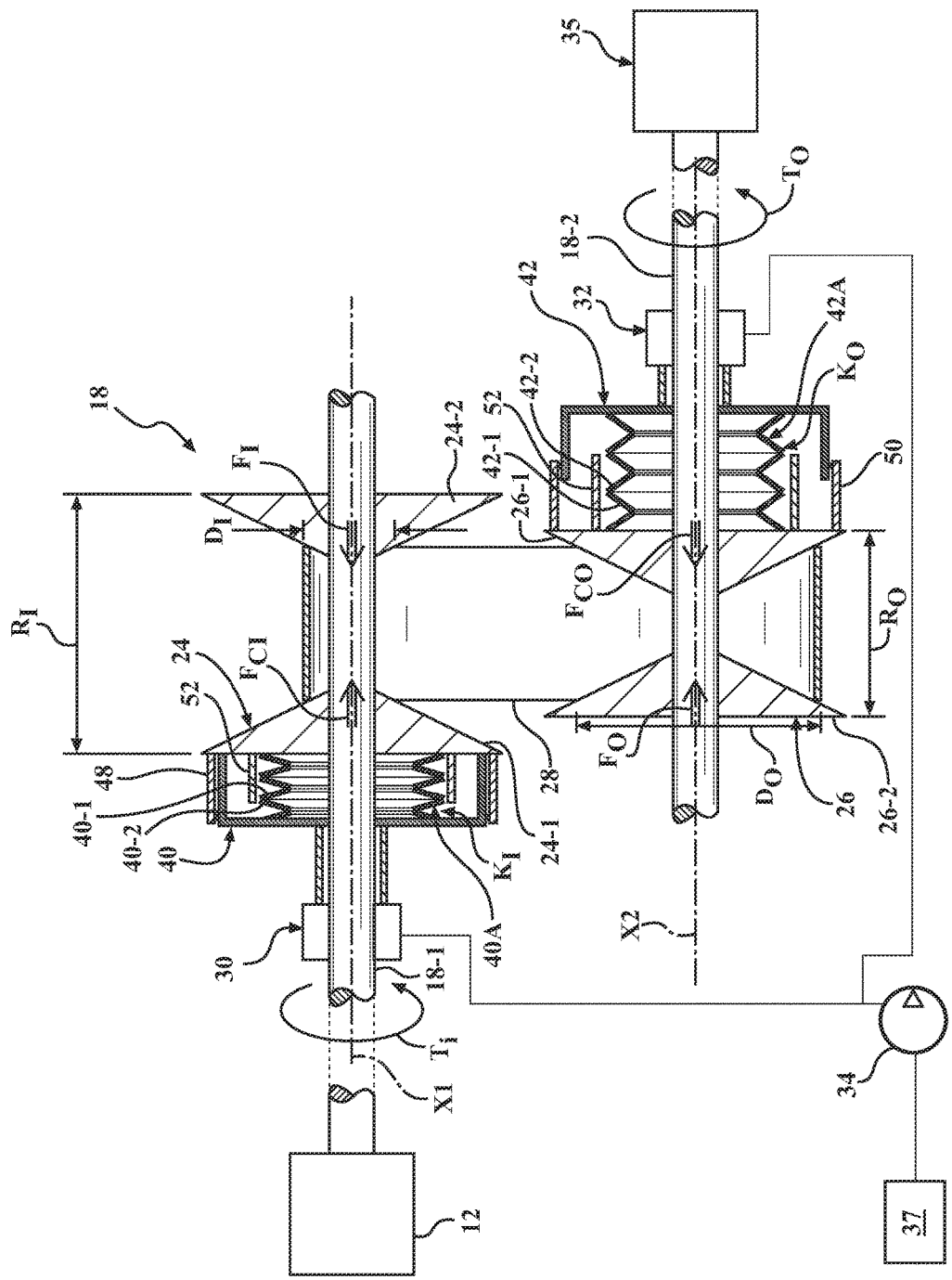
FIG. 2 is a schematic partially cross-sectioned illustration of the CVT assembly shown in FIG. 1 having first and second elastic elements configured to apply respective first and second constant spring clamping forces to a continuous torque-transmitting element according to one embodiment; depicted operating in underdrive mode.
Figure 3:
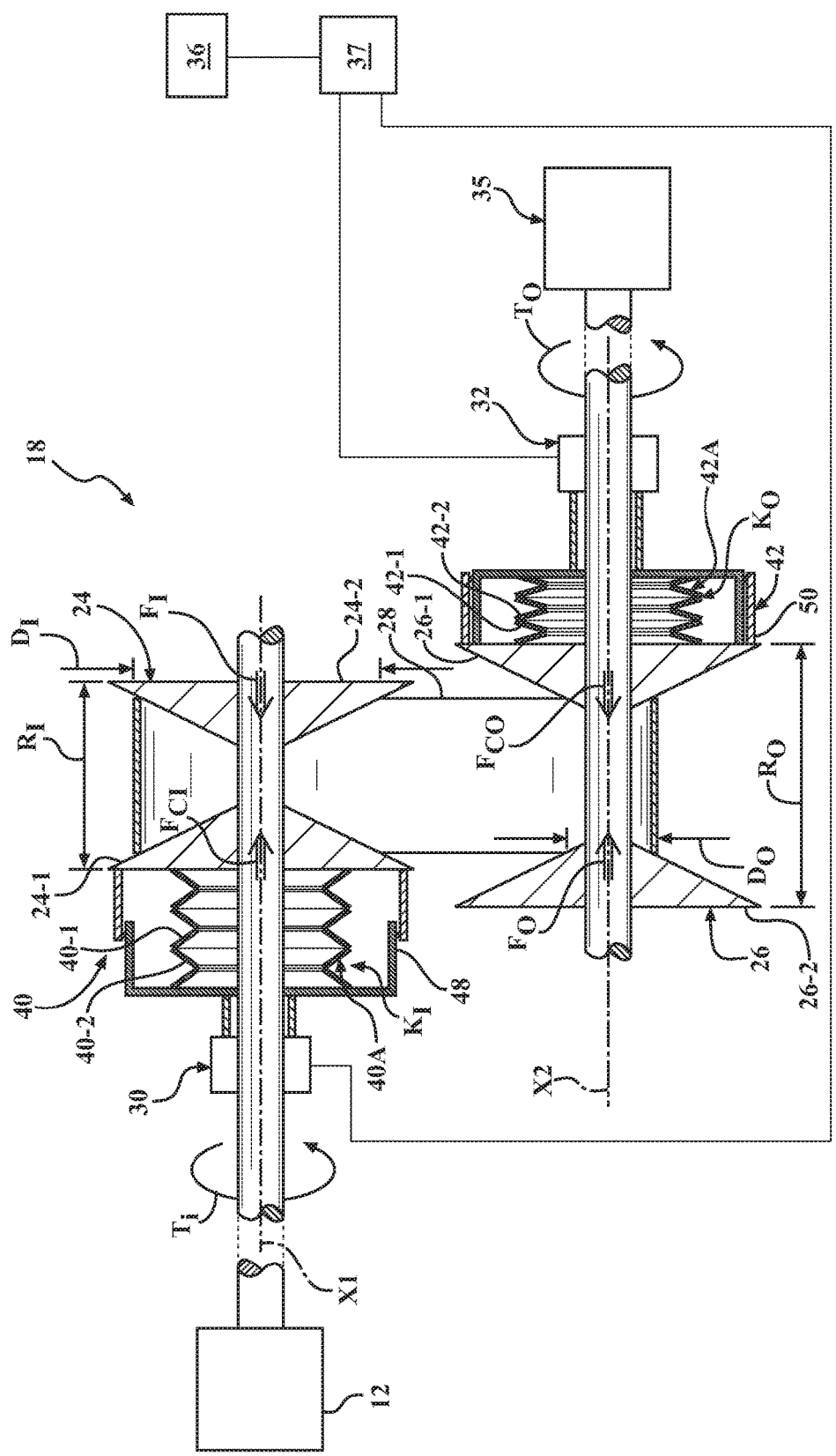
FIG. 3 is a schematic partially cross-sectioned illustration of the multiple-mode CVT assembly shown in FIG. 2 according to another embodiment; depicted operating in overdrive mode.

The vehicle 10 also includes a continuously-variable transmission (CVT) assembly 18 for operatively connecting the power-source 12 to the drive axle(s) 14 and transferring the power-source torque $T_i$ thereto. As shown, the power-source is mounted in the vehicle 10 externally with respect to the CVT assembly 18, i.e., the CVT assembly 18 may be operatively connected to the power-source 12 and be appropriately fastened thereto. As shown in FIGS. 2-3, the CVT 18 is configured as a variable-diameter pulley system 20, otherwise known as a "Reeves drive". The CVT assembly 18 includes an assembly input member 18-1 configured to receive the power-source torque $T_i$. The CVT assembly 18 also includes an assembly output member 18-2. The assembly output member 18-2 is configured to carry an output torque $T_o$ from the assembly to the drive axle(s) 14, such as through a final drive assembly 35.

As shown, the variable-diameter pulley system 20 includes an input pulley 24 having a variable-diameter $D_I$ and a variable-diameter output pulley 26 having a variable-diameter $D_O$. Each pulley 24 and 26 is split perpendicular to its respective axis of rotation X1 and X2, and operatively connected via a continuous torque-transmitting element 28 extending therebetween. Specifically, the torque-transmitting element 28 may be a belt or a chain having a V-shaped cross section. Each of the variable-diameter input pulley 24 and the variable-diameter output pulley 26 includes a respective range of adjustment—an input range $R_I$ and an output range $R_O$—relative to the respective axes of rotation X1 and X2.

The input member 18-1 is operatively connected to the input pulley 24. Specifically configured actuators, an input actuator 30 and an output actuator 32, may be employed to vary the effective diameters of the respective input and output pulleys 24, 26. The input actuator 30 and the output actuator 32 may be configured as a respective input hydraulic piston and output hydraulic piston, each energized by a fluid pump 34 (shown in FIG. 2), or respective input and output electric motors (shown in FIG. 3) receiving an electrical current from a device 36 configured to generate and/or store energy, such as an alternator or a battery. Furthermore, such respective input and output actuators 30, 32 may be employed to generate respective input and output actuator forces $F_I$ and $F_O$. to vary effective diameters of the respective input and output pulleys 24, 26. An electronic controller 37 may be employed to regulate operation of each of the fluid pump 34 and the input and output electric motors energized by the device 36.

The variable-diameter input pulley 24 includes an adjustable moveable first sheave 24-1 and a stationary second sheave 24-2. Similarly, the variable-diameter output pulley 26 includes a moveable first sheave 26-1 and a stationary second sheave 26-2. In other words, while each of the second sheaves 24-2 and 26-2 is not configured to adjust the respective input and output ranges $R_I$, $R_O$, each of the first sheaves 24-1 and 26-1 is configured to be pre-loaded, to thereby facilitate application of an appropriate clamping force along the respective axes of rotation X1 and X2 to the torque-transmitting element 28.

The speed ratio of the CVT 18 is changed by concurrent movement of the respective sheaves 24-1, 26-1 which changes the effective diameters $D_I$ and $D_O$ of the pulleys 24, 26. As noted above, such movement of the respective sheaves 24-1, 26-1 may be affected by the respective input and output actuators 30, 32. Moreover, the input actuator 30 may be configured to establish the range of adjustment $R_I$ of the variable-diameter input pulley 24 and vary the diameter $D_I$. Similarly, the output actuator 32 may be configured to establish the range of adjustment $R_O$ of the variable-diameter output pulley 26 to vary the diameter $D_O$. Accordingly, the input and output actuators 30, 32 together select a position of the continuous torque-transmitting element 28 relative to the input and output pulleys 24, 26 and thereby select the speed ratio of the CVT 18.

For example to generate a numerically higher speed ratio, the first sheave 24-1 is moved farther apart relative to the second sheave 24-2 of the input pulley 24, while, simultaneously, the first sheave 26-1 is moved closer together relative to the second sheave 26-2 of the output pulley 26. In such a case, the V-shaped cross section of the torque-transmitting element 28 causes the element to ride lower on the input pulley 24 and higher on the output pulley 26. On the other hand, to generate a numerically lower speed ratio, the first sheave 24-1 is moved closer together relative to the second sheave 24-2 of the input pulley 24, while, simultaneously, the first sheave 26-1 is moved farther apart relative to the second sheave 26-2 of the output pulley 26. In such a case, the V-shaped cross section of the torque-transmitting element 28 causes the element to ride higher on the input pulley 24 and lower on the output pulley 26.

The CVT assembly 18 also includes a first or input elastic element 40 having a first zero stiffness or spring rate $K_I$ over the range of adjustment $R_I$ of the input pulley 24. The elastic element 40 is configured to apply a first substantially constant spring clamping force $F_{CI}$ along the axis of rotation X1 via the input pulley 24, and in particular through the first sheave 24-1, to the continuous torque-transmitting element 28. Accordingly, while the spring rate $K_I$ may be non-linear and have some variation outside the range of adjustment $R_I$ of the input pulley 24, the spring rate $K_I$ is substantially or nearly zero across underdrive and overdrive speed ratios of the CVT assembly 18. The CVT assembly 18 additionally includes a second or output elastic element 42 having a second zero stiffness $K_O$ over the range of adjustment $R_O$ of the output pulley 26. The second elastic element 42 is configured to apply a second substantially constant spring clamping force $F_{CO}$ along the axis of rotation X2 via the output pulley 26, and in particular through the second sheave 26-2, to the continuous torque-transmitting element 28. Similar to the spring rate $K_I$, the spring rate $K_O$ may be non-linear and have some variation outside the range of adjustment $R_O$ of the input pulley 26, the spring rate $K_O$ is substantially or nearly zero across underdrive and overdrive speed ratios of the CVT assembly 18.

The first and second substantially constant forces $F_{CI}$, $F_{CO}$ generated by the respective first and second elastic elements 40, 42 are employed as preload forces configured to maintain each specific position of the continuous torque-transmitting element 28 selected by the input and output actuators 30, 32. The first and second substantially constant clamping forces $F_{CI}$, $F_{CO}$ may also be used in conjunction with other hydraulically or electrically generated clamping forces to maintain desired positions of the continuous torque-transmitting element 28.

Each of the input elastic element 40 and the output elastic element 42 may be configured as one or more conical or Belleville springs, shown in FIGS. 2 and 3 as springs 40-1 and 40-2 in the input elastic element and springs 42-1 and 42-2 in the output elastic element. In an embodiment where either the input elastic element 40 or the output elastic element 42 includes multiple Belleville springs, such as the respective springs 40-1, 40-2 and springs 42-1, 42-2, such Belleville springs may be arranged adjacent to one another in a respective spring stack 40A, 42A. As shown in FIG. 2-5, in such a spring stack 40A or 42A, at least two adjacent Belleville springs, such as the springs 40-1, 40-2 or the springs 42-1, 42-2, may be arranged in series and/or in parallel.

Belleville springs 40-1, 40-2 and 42-1, 42-2 may be stacked either in series or in parallel to modify the overall spring constant or amount of deflection of the stack. Stacking the springs 40-1, 40-2 and 42-1, 42-2 in the same direction adds the spring constant in parallel, creating a stiffer joint with a generally unchanged deflection. On the other hand, stacking the springs 40-1, 40-2 and 42-1, 42-2 in an alternating direction results in adding springs in series, generating a reduced spring constant and greater deflection as compared with the parallel arrangement. Mixing and matching directions allows a specific spring constant and deflection capacity to be achieved. Generally, if multiple identical Belleville springs are stacked in parallel (facing in the same direction), the deflection is equal to that of one washer, while the resultant load is equivalent to that of a single spring times the number of springs in the stack. On the other hand, if multiple Belleville springs are stacked in series (facing in alternating directions), the deflection is equal to the deflection of a single spring times the number of Belleville springs, while the resultant load is equal to that of one spring.

Figure 4:
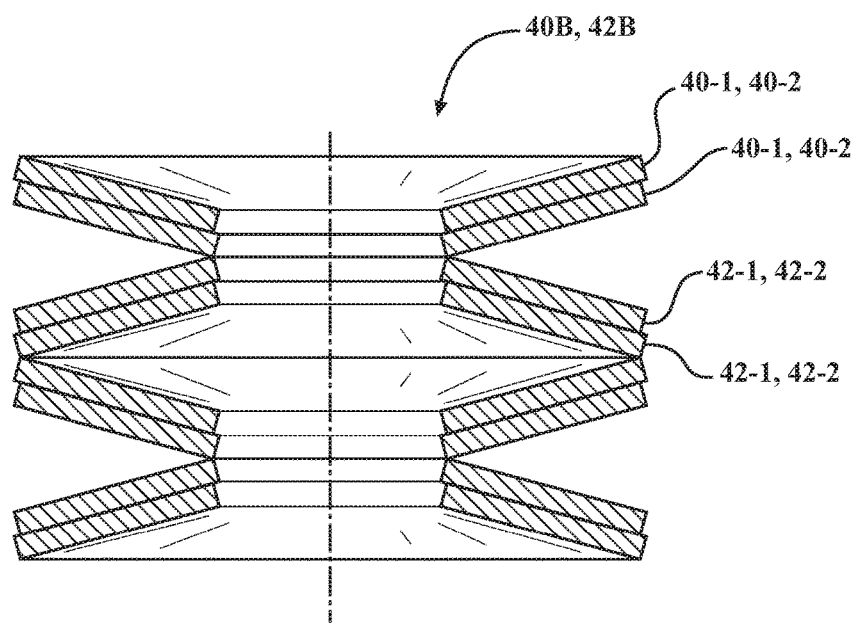
FIG. 4 is a schematic partially cross-sectioned illustration of the first and second elastic elements having adjacent Belleville springs arranged in a series/parallel stack.

Accordingly, as shown in FIGS. 2 and 3, in the series arrangement of the respective spring stacks 40A, 42A, the adjacent Belleville springs 40-1, 40-2 or springs 42-1, 42-2 are arranged to face in alternating directions and contact directly at respective outer diameters OD, i.e., the respective springs 40-1, 40-2, and at respective inner diameters ID, i.e., the springs 42-1, 42-2. Additionally, in another embodiment of the spring stacks 40A and 42A, as shown in FIG. 4, multiple adjacent Belleville springs may be arranged in a series/parallel stack 40B or 42B. Multiple adjacent Belleville springs 40-1 or 42-1 may be arranged in parallel with respect to each other, i.e., facing in the same direction, and multiple adjacent Belleville springs 40-2 or 42-2 may also be arranged in parallel with respect to each other. In the same stack 40A or 42A, the set of multiple parallel springs 40-1 or 42-1 may then be arranged in series with multiple parallel springs 40-2 or 42-2, such that one set of parallel springs is arranged in an alternating direction relative to another set of parallel springs.

Figure 5:
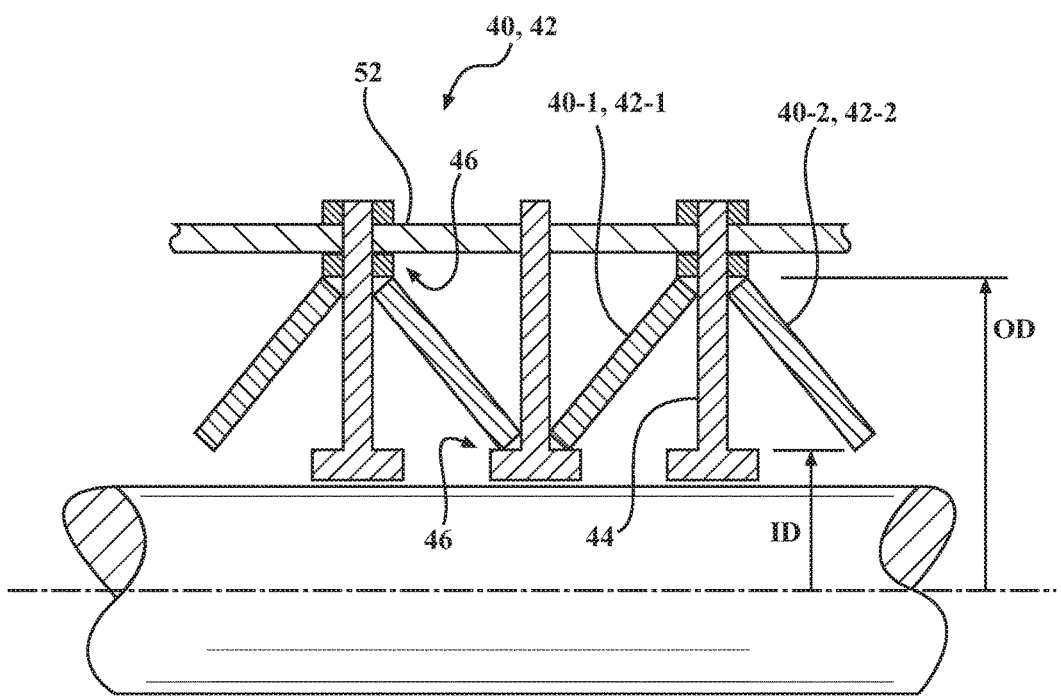
FIG. 5 is a schematic partially cross-sectioned illustration of the first and second elastic elements having a stack of adjacent Belleville springs arranged in series and including spacers arranged between two adjacent Belleville springs.

As shown in FIG. 5, the input elastic element 40 and/or the output elastic element 42 may additionally include one or more spacers 44, each arranged between the two adjacent Belleville springs, such as between the spring 40-1 and spring 40-2 and/or between the spring 42-1 and the spring 42-2. As shown, each of the two adjacent Belleville springs 40-1, 40-2 and springs 42-1, 42-2 is defined by an outer diameter OD and an inner diameter ID. The spacer 44 may be configured to guide the two adjacent Belleville springs 40-1, 40-2 or springs 42-1, 42-2 relative to each other either at the respective outer diameters OD or at the respective inner diameters ID. Accordingly, in such an arrangement, the adjacent Belleville springs 40-1, 40-2 or springs 42-1, 42-2 may transfer forces therebetween via respective outer diameters OD or inner diameters ID. The spacer 44 may include a retaining feature 46 configured to engage the two adjacent Belleville springs 40-1, 40-2 or 42-1, 42-2 at the respective outer diameters OD or at the respective inner diameters ID. The retaining feature 46 may be configured as a ridge or a step, as shown in FIG. 5.

As shown in FIGS. 2 and 3, the CVT assembly 18 may additionally include an input elastic element housing 48 and an output elastic element housing 50. As also shown, the input elastic element 40 may be arranged inside the input elastic element housing 48, while the output elastic element 42 may be arranged inside the output elastic element housing 50. Additionally, as shown in FIGS. 2 and 5, the input elastic element housing 48 and output elastic element housing 50 may be respectively configured to guide the first elastic element 40 and second elastic element 42 via a guide feature 52. The guide feature 52 may be formed integrally with the housing 48, or be an element fastened thereto.

Overall, the first spring rate $K_I$ of the input elastic element 40 and the second zero stiffness $K_O$ of the output elastic element 42 permit the substantially constant first and second spring clamping forces $F_{CI}$, $F_{CO}$ to be applied to the respective input and output pulleys 24, 26 over the entire range of adjustment $R_I$ and $R_O$. In turn, the substantially constant spring clamping forces $F_{CI}$, $F_{CO}$ may enable a reduction in the associated hydraulically or electrically generated clamping forces and, thus, usage of a reduced power-consumption fluid pump 34 (shown in FIG. 2) or a lower current input and output electric motor embodiments (shown in FIG. 3) of the respective input and output actuators 30, 32. Accordingly, due to such a reduction in either hydraulically or electrically generated clamping forces, the substantially constant spring clamping forces $F_{CI}$, $F_{CO}$ may facilitate enhanced efficiency in the CVT assembly 18 both in numerically higher, i.e., underdrive, speed ratios of the CVT assembly 18 and numerically lower, i.e., direct and overdrive, speed ratios.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A continuously-variable transmission (CVT) assembly for transmitting a torque from an external power-source, comprising:
   a variable-diameter input pulley having a range of adjustment;
   a variable-diameter output pulley having a range of adjustment;

a continuous torque-transmitting element extending between the variable-diameter input pulley and the variable-diameter output pulley and thereby operatively connecting the input pulley to the output pulley;

a first elastic element having a first zero stiffness over the range of adjustment of the variable-diameter input pulley and configured to apply a first constant spring clamping force via the variable-diameter input pulley to the continuous torque-transmitting element; and a second elastic element having a second zero stiffness over the range of adjustment of the variable-diameter output pulley and configured to apply a second constant spring clamping force via the variable-diameter output pulley to the continuous torque-transmitting element.

2. The CVT assembly according to claim 1, wherein at least one of the first and second elastic elements is configured as at least one Belleville spring.

3. The CVT assembly according to claim 2, wherein the at least one Belleville spring includes multiple Belleville springs arranged in a stack.

4. The CVT assembly according to claim 3, wherein two of the multiple Belleville springs in the stack are adjacent and arranged in series.

5. The CVT assembly according to claim 4, further comprising a spacer arranged between the two adjacent Belleville springs.

6. The CVT assembly according to claim 5, wherein each of the adjacent Belleville springs is defined by an outer diameter and an inner diameter, and wherein the spacer is configured to guide the two adjacent Belleville springs relative to each other at one of the respective outer diameters and respective inner diameters.

7. The CVT assembly according to claim 6, wherein the spacer includes a retaining feature configured to engage the two adjacent Belleville springs at the respective outer or inner diameters.

8. The CVT assembly according to claim 1, further comprising an input elastic element housing and an output elastic element housing, wherein the first elastic element is arranged inside the input elastic element housing and the second elastic element is arranged inside the output elastic element housing.

9. The CVT assembly according to claim 8, wherein the input elastic element housing and output elastic element housing are respectively configured to guide the first elastic element and second elastic element.

10. The CVT assembly according to claim 1, further comprising:
an input actuator configured to establish the range of adjustment of the variable-diameter input pulley and vary the diameter thereof; and
an output actuator configured to establish the range of adjustment of the variable-diameter output pulley and vary the diameter thereof;
wherein the input and output actuators together select a position of the continuous torque-transmitting element.

11. A motor vehicle comprising:
a power-source configured to generate a drive torque;
a drive axle; and
a continuously-variable transmission (CVT) assembly configured to operatively connect the power-source to the drive axle and transmit the drive torque thereto, comprising:

a variable-diameter input pulley having a range of adjustment;

a variable-diameter output pulley having a range of adjustment;

a continuous torque-transmitting element extending between the variable-diameter input pulley and the variable-diameter output pulley and thereby operatively connecting the input pulley to the output pulley;

a first elastic element having a first zero stiffness over the range of adjustment of the variable-diameter input pulley and configured to apply a first constant spring clamping force via the variable-diameter input pulley to the continuous torque-transmitting element; and a second elastic element having a second zero stiffness over the range of adjustment of the variable-diameter output pulley and configured to apply a second constant spring clamping force via the variable-diameter output pulley to the continuous torque-transmitting element.

12. The motor vehicle according to claim 11, wherein at least one of the first and second elastic elements is configured as at least one Belleville spring.

13. The motor vehicle according to claim 12, wherein the at least one Belleville spring includes multiple Belleville springs arranged in a stack.

14. The motor vehicle according to claim 13, wherein two of the multiple Belleville springs in the stack are adjacent and arranged in series.

15. The motor vehicle according to claim 14, wherein the CVT additionally includes a spacer arranged between the two adjacent Belleville springs.

16. The motor vehicle according to claim 15, wherein each of the adjacent Belleville springs is defined by an outer diameter and an inner diameter, and wherein the spacer is configured to guide the two adjacent Belleville springs relative to each other at one of the respective outer diameters and respective inner diameters.

17. The motor vehicle according to claim 16, wherein the spacer includes a retaining feature configured to engage the two adjacent Belleville springs at the respective outer or inner diameters.

18. The motor vehicle according to claim 11, wherein the CVT additionally includes an input elastic element housing and an output elastic element housing, wherein the first elastic element is arranged inside the input elastic element housing and the second elastic element is arranged inside the output elastic element housing.

19. The motor vehicle according to claim 18, wherein the input elastic element housing and output elastic element housing are respectively configured to guide the first elastic element and second elastic element.

20. The motor vehicle according to claim 19, wherein the CVT additionally includes:
an input actuator configured to establish the range of adjustment of the variable-diameter input pulley and vary the diameter thereof; and
an output actuator configured to establish the range of adjustment of the variable-diameter output pulley and vary the diameter thereof;
wherein the input and output actuators together select a position of the continuous torque-transmitting element.

* * * * *